March 12, 1929.  W. W. WOODRUFF ET AL  1,705,104
TRANSMISSION TOWER
Filed Sept. 2, 1927   2 Sheets-Sheet 1
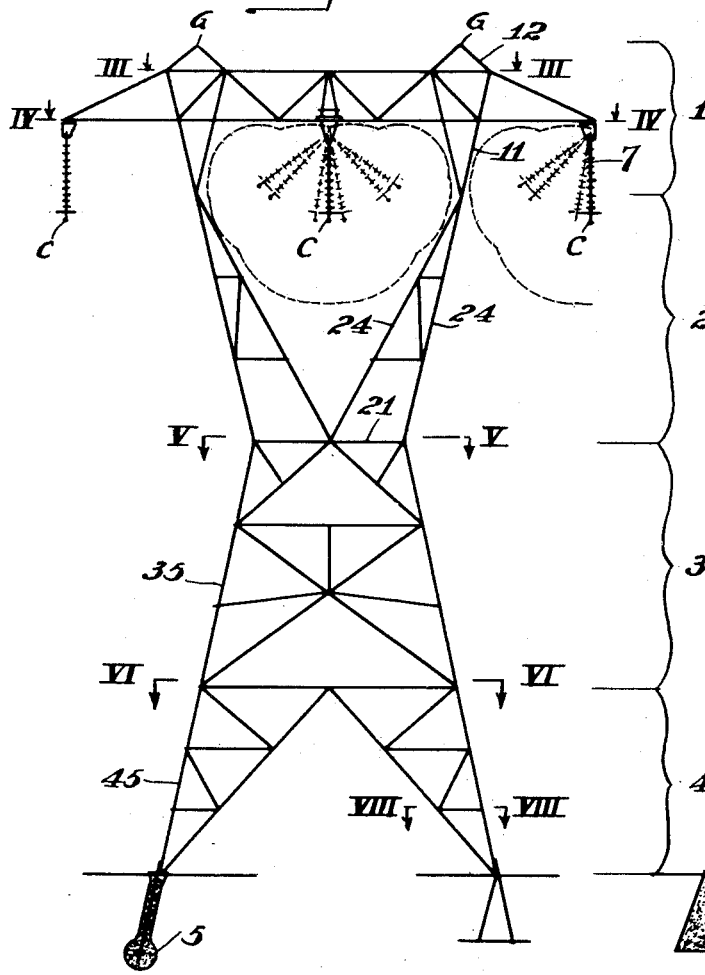

March 12, 1929.  W. W. WOODRUFF ET AL  1,705,104
TRANSMISSION TOWER
Filed Sept. 2, 1927   2 Sheets-Sheet 2
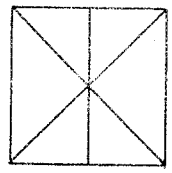
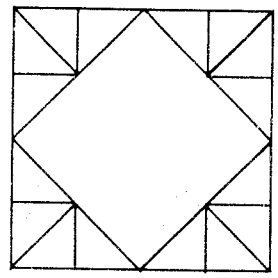
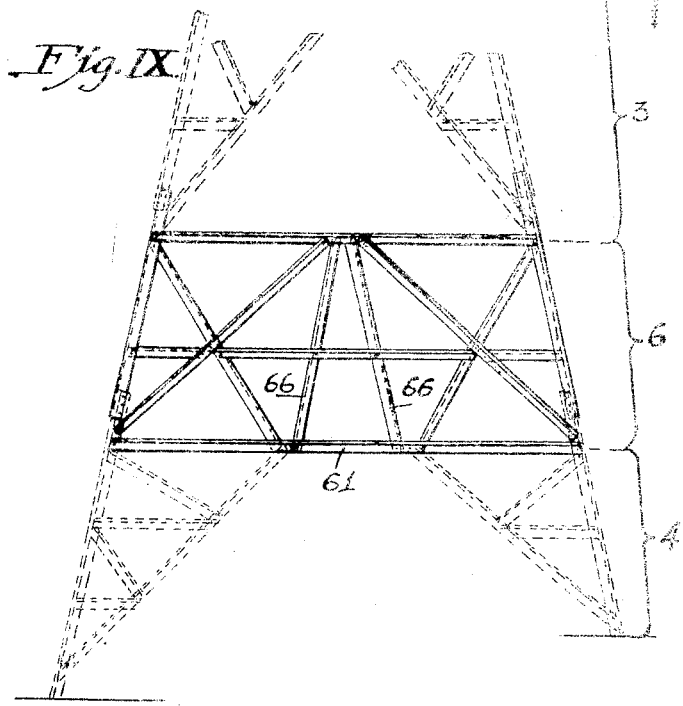
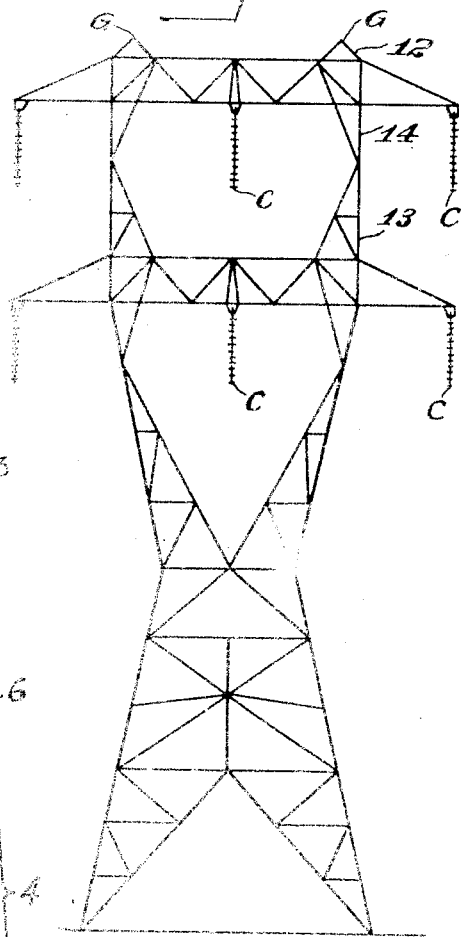

Patented Mar. 12, 1929.

1,705,104

UNITED STATES PATENT OFFICE.

WILLIAM WARREN WOODRUFF, OF SWARTHMORE, AND RALPH LINDSAY JENNER, OF GERMANTOWN, PENNSYLVANIA, AND AUSTIN H. REEVES, OF CLINTON, NEW JERSEY, ASSIGNORS TO BLAW-KNOX COMPANY, OF BLAWNOX, PENNSYLVANIA, A CORPORATION OF NEW JERSEY.

TRANSMISSION TOWER.

Application filed September 2, 1927. Serial No. 217,026.

This invention relates particularly to, but is not necessarily limited to, steel towers which support the three conductors of a three-phase circuit when extended in "flat" arrangement, that is to say, in a horizontal or substantially horizontal plane, at points of support. In addition to the three conductors there may be one or more ground wires above. The invention has for an object to provide the most economical tower supports for electric power transmission lines.

Another object of the invention is to provide a steel transmission tower suitable for the greater conductor-to-steel clearances required by higher voltages. The swinging of the wires from long strings of insulators calls for a large clearance space around each conductor, and to obtain this in "flat" disposition of conductors requires a long cross-arm and consequent large distances between supporting members in transverse direction across the line.

A further object of the invention is to provide a transmission tower in which the spread of the corner posts in the lower portion of the tower may be equal or nearly equal both in the longitudinal direction in which the wires extend and in the direction transverse thereto.

A further object of the invention is to provide an extension to the tower, an extension which may or may not be used, but the availability of which will result in the maximum saving in weight of a given installation and yet afford maximum enjoyment of the advantage which is found in duplication of parts.

A further object is to provide ideal foundation conditions, as well as making possible the greatest economy in cost of foundations both for materials and installation.

A further object is to provide as nearly as possible an ideal transmission tower by sloping the corner posts from the foundations so that, if prolonged, they would meet at a point approximately at the center of gravity of the load. This eliminates as far as possible all web stresses and the stresses in the posts will be nearly constant for their entire length.

A further object is, because of the practical constancy of stress in the tower posts at different heights, to provide a tower in which the same type of leg may be used, even after insertion of a small (say 5 or 10 foot) or a larger (say 25 or 30 foot) extension.

A further object is to provide a tower capable of supporting a long cross-arm at points requiring the supporting elements to be spread a considerable distance apart along the cross-arm and capable of having a maximum practical spread at the base with a minimum cost of entire supporting structure,—tower, together with its foundations.

A further object is to provide a more statically determinate tower, that is, one in which the stresses can be figured with greater precision and certainty.

A further object is to provide a tower pleasing to the eye; that is with the shapliness resulting from materials properly distributed to meet most scientifically the fundamental requirements, such as electrical clearance of conductors, economy in the steel tower and its foundations, and superposed loading.

A further object is to produce the lightest weight of tower, or of tower and foundations, or of tower, extension, and foundations—in order to minimize cost of handling, of distribution, and of erection after delivery on purchaser's railroad siding.

The invention is illustrated in the accompanying drawings. Fig. I is a view in front elevation and Fig. II is a view in side elevation of a tower embodying our invention. Figs. III-VI are views in horizontal section on the planes indicated successively at III—III, IV—IV, V—V, and VI—VI, Fig. I. Fig. VII is a view in vertical section, on the plane indicated at VII—VII, Fig. IV. Fig. VIII is a view in horizontal section, on the plane indicated at VIII—VIII, Fig. I. Fig. IX is a fragmentary view in elevation (front and side elevation are alike) of a certain extension unit in assembly with other parts. Fig X is a view in front elevation of a tower adapted to carry two three-conductor lines.

Towers of this character are now commonly built of rolled steel angles. In the drawings we have indicated by single lines the lengths of material of which the towers are built. It will be understood that these single lines may indicate lengths of the usual steel angle or of any other suitable material. In Fig. IX, however, we show the structural members in actual form.

Referring, first, to Figs. I and II, the integrated and unitary structure here shown may for purposes of description be considered as made up of a plurality of elements or component parts; these elements or component parts demarcated by brackets are, from top to base, cross-arm, 1; tower arms, 2; tower body, 3; and tower legs, 4.

The tower body 3 and the tower arms 2 constitute that portion of the tower structure which is invariably present in every erection, and with this invariable portion other parts or elements may be interchangeably combined. The tower body 3, fully illustrated in Figs. I, II, V, and VI, is of truncated pyramidal shape, square in cross-section. The tower arms 2 are duplicates; they are wedge shaped, with bases 21 oblique to their mid-planes, and with sides 22 converging from base 21 toward apices or edges 23. The bases 21 of these tower arms lie in common plane with the upper base of the pyramidal tower body 3, and from this plane the rising tower arms diverge. The base of each tower arm is in longitudinal direction (that is to say, in the direction in which the sustained electric wires extend) equal in length to the edge of the upper base of the pyramidal tower body 3, and in its breadth the base of the tower arm is less than the breadth of the upper base of the tower body. Preferably the breadth of the base of the arm is exactly half that of the upper base of the body, and the combined bases of the two arms are equal in extent and coincident with the upper base of the body. The converging sides 22 of the arms extend in common plane with the sides 32 of the body, and the angle which the sides 24 of the arms form one with another is such that they meet in an apex or edge prolonged in the direction in which the sustained electric wires extend.

The tower legs 4 are four in number. Each in shape is tetrahedral, in the form of a triangular pyramid whose base is a right-angled isosceles triangle and which rises obliquely from its base. Compare Figs. I, II, and VIII. The pyramidal legs are assembled base to base with the tower body and taper downwardly. In dimensions the side of the triangular base of each leg member is half the length of the side of the lower square base of the tower body, and in the assembly the sides of the bases of the leg members coincide with and are coextensive with the sides of the lower base of the tower. The obliquity of the leg members is such that when applied the edge 45 of the leg member extends in common and continuous line with the edge 35 of the tower body.

Leg members having these characteristics may be made of any desired length, as will be perceived on considering Fig. IX, where in dotted lines two leg members unequal in length are shown. Leg members then may be designed in several standard lengths, for alternative use and for various combinations, with one and the same tower body, and in the erection of a succession of towers, different leg combinations may be made with the successive tower bodies, and so accommodation made to irregularities of ground surface. In consequence, the anchors 5 with which the legs 4 at their apices are engaged, and which ordinarily are bulky blocks of concrete sunk in the ground, need not be built up as otherwise they would have to be, to make compensation for such irregularity of terrain. The drawings show anchors of several specific forms, but the showing is suggestive merely; our invention is not involved with particular forms of anchor.

Further provision in this matter of adjustability in height is found in an extension member 6, illustrated in Fig. IX. It also is of truncated pyramidal form, and its shape and proportions are such that when combined with the tower body 3 it forms an enlarged and heightened tower body. It is in this combination arranged beneath tower body 3; its upper base is coextensive with and is adapted to be made coincident with the lower base of tower body 3 and the angular inclination of its sides is identical with that of the tower body 3. Its lower base is necessarily greater in extent than is the lower base of the tower body 3, and, in order to afford proper engagement for the foot members, the sides 61 of the base are strengthened by braces 66 at points remote from the corners at distances equal to the length of the sides of the triangular bases of the foot members. Such extension members may be designed of various heights, and in this respect again each particular tower body 3, in the succession of a given installation, may be more minutely accommodated to irregularities of ground surface.

By forming the tower arms with bases less in breadth than the upper base of the tower body, as described and as shown in Fig. I, we have found that it becomes possible to build the corner posts of lighter material and to reduce the size and the cost of the foundations. In case the supported conductor on one side breaks, the consequent unbalanced stress, instead of being concentrated upon the corner posts on the side of the broken wire, is distributed through the braces and transmitted in part to the corner posts on the opposite sides. While it is true that the braces of the tower must be made of heavier material than otherwise would be required, the corner posts and foundations may, as has been said, be made lighter, and this with net gain in economy.

The opposite front and rear faces of the tower, when considered with relation to the direction of the supported wires, converge in continuous planes, from the ground to the upper ends 23 of the tower arms, the arms terminate in edges 23 which, extending in the direction of the supported wires, afford extended support for the cross-arm structure. The features make for maximum strength to sustain and distribute the strain of service.

The cross-arm is essentially the trussed structure illustrated in Figs. I–IV. It is adapted to carry, suspended from it at its extremities and at the mid-point in its length, the three wires C of a three-phase circuit. These wires swing at the ends of suspension members 7, and the tower structure must be such that under conditions of service the danger of discharge from a wire subject to high electric tension to the tower structure is guarded against. To this end we raise the cross-arm upon wedge-shaped supports 11 which rest edge to edge upon the tower arms 2 and which flare upwardly. Thus, while the cross arm is more adequately and more effectively supported, the spaces beneath the cross arm, within which the suspended wires may swing, is widened downwardly; and, in the middle region particularly of the extent of the cross arm, the space beneath the cross arm and between the upwardly flaring tower arms is free and unobstructed. We prolong the suspension members 7 from the cross-arm 1 downwardly, so that the wires C are carried at points somewhat below the horizontal plane in which the edges of tower arms 2 and of supports 11 meet, that is, somewhat below the plane of widest space interval. The range of swing of the wires laterally from the vertical normally does not exceed 8° 27'. It may accidentally very much exceed that figure. We have in Fig. I indicated lateral swings of 8° 27', 42° 43', and 52° 48', and we have indicated by dotted curves the minimum space interval at which the wires in those three positions of lateral swing are remote from the tower parts. It will be perceived that by those features of structure and proportion which we have indicated, this space interval is of maximum extent and is most effectively utilized.

The ground wires G may be carried on suitable trusses 12, erected on the upper side of the cross-arm and each of them (there are two) may be placed vertically above the supporting edges 23 of the tower arms.

The mode of support of each wire C in cross-arm 1 will be understood on comparing Figs. I and VII. And since the point of support of the middle wire is approximately the center of the load which the tower carries, the tower will be so designed that the apex of the pyramid to which the tower body conforms comes to substantial coincidence with that central point.

Fig. X shows that the cross-arms may be increased in number in vertical superposition, each superior arm carried on the double wedge support 13, 14, the two wedges being coincident at their edges. The wires C are suspended as before in a somewhat lower plane than that in which these coincident edges lie, and thus widest clearance is afforded the swinging wires.

We claim as our invention:

A trussed tower including a body of truncated pyramidal shape, an extension member also of truncated pyramidal shape and adapted to be united with the body, its faces extending when united with the body in common planes with the faces of the body, and a plurality of foot members of tetrahedral shape adapted to be united either with the body or with the extension, two faces of each foot member extending, when united either with body or with extension member, in common planes with two faces of the part with which union is made.

In testimony whereof we have hereunto set our hands.

WILLIAM WARREN WOODRUFF.
RALPH LINDSAY JENNER.
AUSTIN H. REEVES.